Feb. 18, 1964 W. A. FAILS 3,121,845

DIFFERENCE AMPLIFIER

Filed Sept. 30, 1960

INVENTOR.
WESLEY A. FAILS

BY

Laurence S. Epstein
ATTORNEY

United States Patent Office 3,121,845
Patented Feb. 18, 1964

3,121,845
DIFFERENCE AMPLIFIER

Wesley A. Fails, Woodland Hills, Calif., assignor to the United States of America as represented by the Secretary of the Navy Filed Sept. 30, 1960, Ser. No. 60,277
1 Claim. (Cl. 330—69)

This invention relates to electrical computing instruments and particularly to subtraction of signals of the same phase or polarity.

This application as part of a series of applications in which copending application Serial Number 60,279 filed September 30, 1960 is a system in which copending application Serial Number 60,278 filed September 30, 1960 and the present invention are employed.

In the prior art if said subtractions were performed by linear elements such as transformers, the function could only be properly performed if the signal were A.C. and then the linear elements lacked proper impedance to permit alteration of the input signals. When cathode followers and phase inverters were used the coupling became quite complex. The present invention overcomes these difficulties by coupling a phase inverter and a cathode follower in a manner which does not require the use of additional elements.

Thus, it is an object of this invention to provide a simple subtraction circuit of high imput impedance.

Another object of this invention is to provide a subtraction circuit wherein the magnitude and phase of the input signals may be altered to perform more perfect subtractions.

Still another object is to provide a subtraction circuit which is more simply constructed than previous subtraction circuits performing the same functions.

Figure 1:
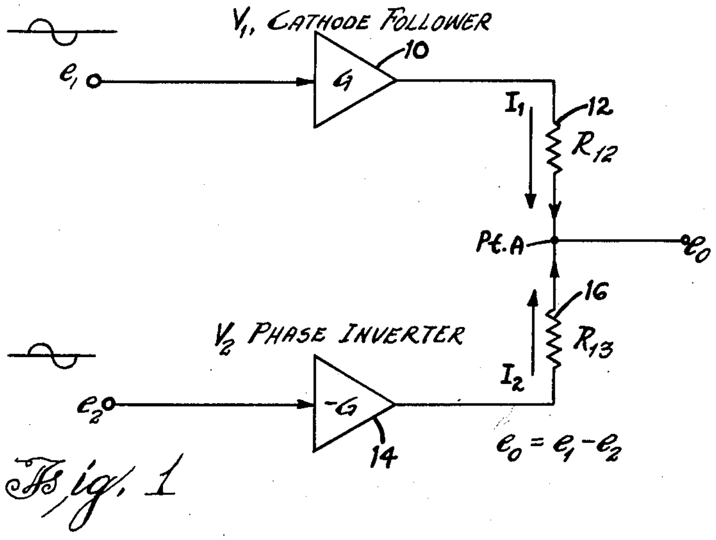
Figure 2:
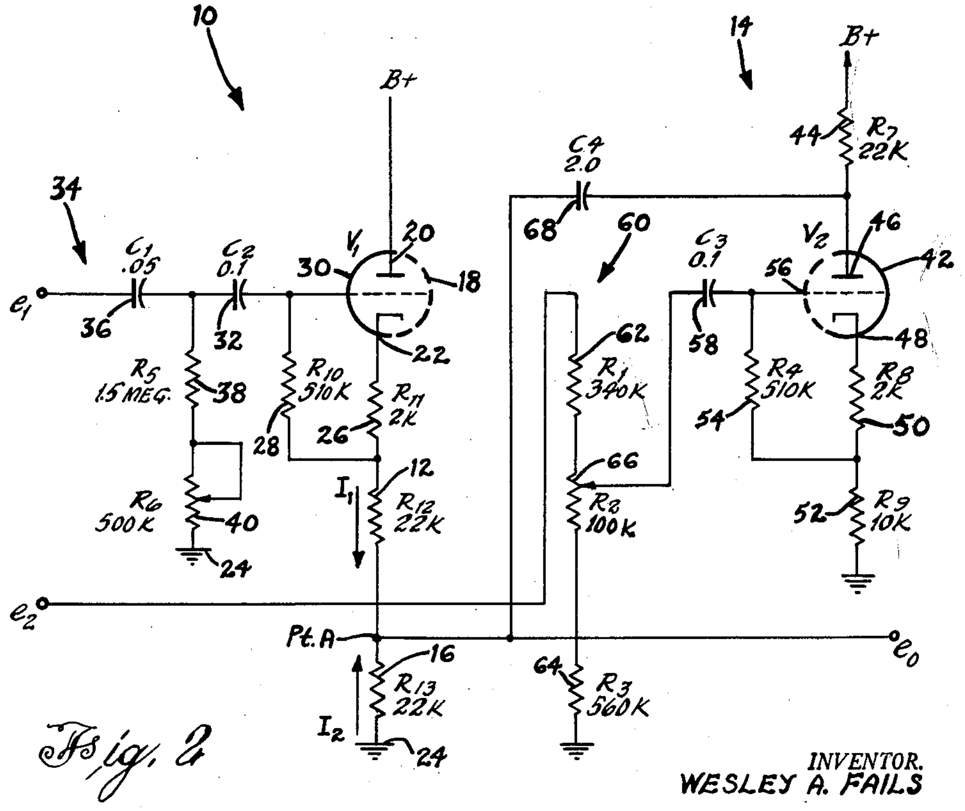

Other objects and many of the attendant advantages of this invention will be readily appreciated as the same becomes better understood by reference to the following detailed description when considered in connection with the accompanying drawings wherein:

FIG. 1 is a functional block diagram of the invention illustrating the basic concept of the present invention; and FIG. 2 is schematic representation of the present invention.

Referring to the figures, signals from input $e_1$ induces current $I_1$ to flow from the cathode follower through a summing resistor 12 to the output. Similarly signal from $e_2$ cause current $I_2$ to flow from a phase inverter 14 to the output of a second coupling resistor 16. Thus through the action of the phase inverter these two currents are subtractive so that the current at point A is equal to the difference between the input signals.

The amplifying tube 18 of the cathode follower 10 is directly coupled to the B+ of the power supply through its plate 20 while its cathode 22 is coupled to the power supply ground 24 through a cathode resistor 26 and the two equally resistant summing resistors 12 and 16. The cathode resistor 26 in conjunction with a feedback resistor 28 provide cathode-grid feedback to the grid 30 and thus increase the effective impedance of the tube. The grid circuit of the cathode follower contains a coupling capacitor 32 to block D.C. and a phase-shifting network 34 to correct phase balance of the network. The phase-shifting network is a fixed capacitor 36 connected in series with the input $e_1$ and the grid with a fixed 38 and variable 40 resistor in series between the grid side of the fixed capacitor 36 and ground 24.

The phase inverter tube 42 receives its power from the B+ power supply through a resistor 44 attached to its anode 46. The cathode 48 of the tube is connected to ground through two resistors 50 and 52. These resistors in conjunction with a feedback resistor 54 coupled to the grid 56 supply cathode grid feedback to increase the effective input impedance to the circuit. The grid of the tube is connected to the input $e_2$ through a coupling capacitor 58 for blocking D.C. and an attenuator 60 used for amplitude balance of the circuit. The attenuator is composed of two fixed resistances 62 and 64 and a variable resistance 66 connected serially between the input $e_2$ and ground. The phase inverter is joined to a summing circuit by a capacitor 68 coupling its plate with the juncture of the two equally resistance resistors 12 and 16 (point A).

In operation, assuming the usual current convention, input signals of the same polarity $e_1$ and $e_2$ are fed respectively into the cathode follower 10 and the phase inverter 14. The $e_1$ signal may be phase shifted to account for accumulated phase error in the phase shifter 30. While the signal $e_2$ can be attenuated by the attenuator 60 to correct the variance in gain between the phase inverter and cathode follower. Signals are then fed into their respective amplifiers which cause current to flow through the coupling resistor associated with it to the output. The current from the cathode follower $I_1$ flows from the cathode 22 to point A while the current from the phase inverter $I_2$ flows from ground to point A. Thus the current at point A is equal to $I_1—I_2$ and thus produces a voltage across the output load which is proportional to the difference between the input signals.

Obviously many modifications and variations of the present invention are possible in the light of the above teachings. It is therefore to be understood that within the scope of the appended claim the invention may be practiced otherwise than as specifically described.

What is claimed is:

A difference amplifier for providing an output voltage proportional to the difference between two input signals comprising:

A cathode follower amplifier producing an output which is a positive direct function of the first of said two signals, said cathode follower including a first electronic valve means having a grid and cathode;

feedback means coupled between the cathode and grid of said first electronic valve means of said cathode follower amplifier;

first means coupling said first signal input to said cathode follower, said means including, phase shifting means for adjusting the phase of the signal applied to the cathode follower;

phase inverting amplifier means for producing an output which is a negative function of the second of said two input voltages, said phase inverting means including a second electronic valve means having a grid, cathode and plate;

second means coupling said second input signal to said phase inverter means, said second means including, attenuating means coupled to the grid of said second electronic valve means of said phase inverter means for varying the magnitude of the input signal applied to the phase inverter means;

feedback means coupled between the grid and cathode of said second electronic valve means of said phase inverter amplifier means;

resistive means coupling the output of said phase inverter means with the output of said cathode follower means, said resistive means including, a first and second resistor having equal ohmic valves, said first resistor coupled at one end to the cathode of the first electronic valve means and coupled at its other end to both the plate of said second electronic value means and one end of said second resistor, said second resistor coupled at its other end to a reference potential, and;

output means coupled to the plate of said second electronic valve means for presenting the difference voltage.

References Cited in the file of this patent

UNITED STATES PATENTS

| | | |
|---|---|---|
| 2,512,676 | Ransom | June 27, 1950 |
| 2,677,729 | Mayne | May 4, 1954 |

FOREIGN PATENTS

| | | |
|---|---|---|
| 678,061 | Great Britain | Aug. 27, 1952 |